US012608014B2

(12) United States Patent (10) Patent No.: US 12,608,014 B2
Fukunaga et al. (45) Date of Patent: Apr. 21, 2026

(54) TRANSPORT SYSTEM

(71) Applicant: TOYOTA JIDOSHA KABUSHIKI KAISHA, Toyota (JP)

(72) Inventors: Daiki Fukunaga, Toyota (JP); Shiro Oda, Anjo (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 18/621,734

(22) Filed: Mar. 29, 2024

(65) Prior Publication Data

US 2024/0345590 A1 Oct. 17, 2024

(30) Foreign Application Priority Data

Apr. 17, 2023 (JP) ................................. 2023-067146

(51) Int. Cl.
 *G05D 1/243* (2024.01)
 *B60P 3/06* (2006.01)
(52) U.S. Cl.
 CPC ................ *G05D 1/243* (2024.01); *B60P 3/06* (2013.01)
(58) Field of Classification Search
 CPC ... G05D 1/243; B60P 3/06; B60P 9/00; B60K 35/00; B62D 63/02; B62D 63/04
 See application file for complete search history.

(56) References Cited

U.S. PATENT DOCUMENTS

| | | | |
|---|---|---|---|
| 2016/0230790 A1* | 8/2016 | Nolan | B60R 11/06 |
| 2020/0150664 A1 | 5/2020 | Sonoura et al. | |
| 2023/0051680 A1 | 2/2023 | Jang | |
| 2023/0111450 A1* | 4/2023 | Wakasa | B41J 11/663 |
| | | | 347/16 |

FOREIGN PATENT DOCUMENTS

| | | |
|---|---|---|
| JP | H10-024841 A | 1/1998 |
| JP | 2019-123568 A | 7/2019 |
| JP | 2020-077295 A | 5/2020 |
| JP | 2022-144293 A | 10/2022 |
| JP | 2023-026354 A | 2/2023 |

* cited by examiner

*Primary Examiner* — Navid Z. Mehdizadeh
*Assistant Examiner* — Micah Chuen-Him Cheng
(74) *Attorney, Agent, or Firm* — Oliff PLC

(57) ABSTRACT

A transport system according to the present disclosure includes a mobile robot that moves with a wagon mounted thereon, the wagon having a plurality of convex portions that protrude downward. The mobile robot includes a platform that has a mounting surface on which the wagon is placed and that enters under the wagon, a raising and lowering mechanism that raises and lowers the platform to deliver the wagon, a plurality of concave portions provided corresponding to the plurality of convex portions of the wagon, an optical sensor provided on a side surface of at least one concave portion among the plurality of concave portions, and a detection unit that detects that at least one of the plurality of convex portions is inserted into the at least one concave portion according to a detection result of the optical sensor.

14 Claims, 7 Drawing Sheets

TRANSPORT SYSTEM

CROSS-REFERENCE TO RELATED APPLICATION

This application claims priority to Japanese Patent Application No. 2023-067146 filed on Apr. 17, 2023, incorporated herein by reference in its entirety.

BACKGROUND

1. Technical Field

This present disclosure relates to a transport system.

2. Description of Related Art

Japanese Unexamined Patent Application Publication No. 2022-144293 discloses an autonomous vehicle that transports a shelf to be transported. The shelf is provided with convex portions, and the autonomous vehicle is provided with engaging portions that engage with the convex portions so as to be fitted over the convex portions in the front and back. A sensor used for docking control intercepts light from a light emitter with an object to be detected, and receives the reflected light with a light receiver.

SUMMARY

As autonomous robot movement alone does not provide high positioning accuracy, it may not be possible to mount a shelf or the like. Since the light emitter and the light receiver are provided on the bottom surface, if dust or the like accumulates, false detection will occur.

A first aspect of the present disclosure relates to a transport system that transports a wagon that has a plurality of convex portions that protrude downward, the transport system including a mobile robot. The mobile robot moves with the wagon mounted thereon. The mobile robot includes a platform that has a mounting surface on which the wagon is placed and that enters under the wagon, a raising and lowering mechanism that raises and lowers the platform in order to deliver the wagon, a plurality of concave portions provided corresponding to the plurality of convex portions of the wagon, an optical sensor provided on a side surface of at least one concave portion among the plurality of concave portions, and a detection unit that detects that at least one convex portion among the plurality of convex portions is inserted into the at least one concave portion according to a detection result of the optical sensor.

In the first aspect, the detection unit may compare an amount of light detected by the optical sensor with a threshold value to determine whether a state of insertion of the convex portion into the concave portion is normal.

In the first aspect, the optical sensor may be provided only in some of the plurality of concave portions.

In the first aspect, a tip of the convex portion may have a curved surface, and a diameter of the convex portion may become smaller toward the tip.

In the first aspect, a tapered surface that widens upward may be provided between the mounting surface and each of the plurality of concave portions.

In the first aspect, one concave portion may be arranged diagonally on the mounting surface with respect to the other concave portion.

In the first aspect, when the convex portion does not enter the concave portion, the transport system determines that there is a loading error, and the transport system is configured to retry loading.

In the first aspect, a surface of the convex portion may have a color that absorbs light.

The transport system according to the first aspect may further include the wagon.

With the aspect of the present disclosure, it is possible to provide a transport system that can appropriately transport an item.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The present disclosure will be described below through an embodiment of the present disclosure, but the claimed disclosure is not limited to the following embodiment. Further, not all of the configurations described in the embodiment are essential as means for solving the problem.

First Embodiment

Figure 1:
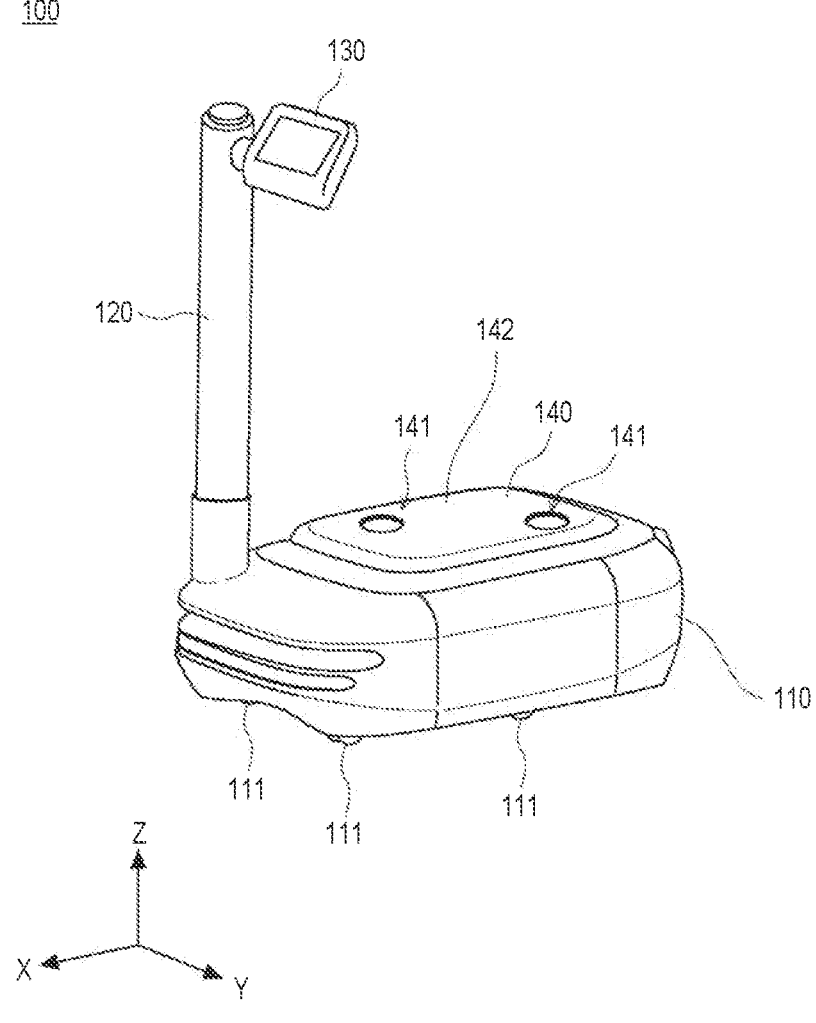
FIG. 1 is a perspective view schematically illustrating an overall configuration of a mobile robot according to an embodiment.

FIG. 1 is a perspective view illustrating the overall configuration of a mobile robot 100 according to the present embodiment. In the following description, an XYZ orthogonal coordinate system will be used as appropriate. The X direction is a front-rear direction of the mobile robot 100, the Y direction is a right-left direction, and the Z direction is a vertical up-down direction. More specifically, the +X direction is defined as a forward direction of the mobile robot 100, and the −X direction is defined as a rearward direction of the mobile robot 100. The +Y direction is a left direction of the mobile robot 100, and the −Y direction is a right direction of the mobile robot 100. The +Z direction is a vertically upward direction, and the −Z direction is a vertically downward direction.

The mobile robot 100 can move both in the forward and rearward directions. That is, when wheels are rotated forward, the mobile robot 100 moves in the forward direction, and when the wheels are rotated reversely, the mobile robot 100 moves in the rearward direction. By adjusting the rotational speed of the right and left wheels differently, the mobile robot 100 can turn left and right.

The mobile robot 100 includes a chassis 110, a stand 120, and an operation unit 130. The chassis 110 is equipped with the wheels, an axle, a battery, a control computer, a drive motor, and the like. The chassis 110 rotatably holds the wheels (not illustrated in FIG. 1). Further, the chassis 110 may be provided with various sensors such as a camera and a distance measuring sensor. Here, the description will be given assuming that the mobile robot 100 is an autonomous mobile robot. Of course, the mobile robot 100 may be a mobile robot that moves according to a user's operation.

The chassis 110 accommodates a raising/lowering platform 140 for loading and unloading a package. The raising/lowering platform 140 is arranged on an upper side of the chassis 110. The raising/lowering platform 140 includes a raising and lowering mechanism driven by a motor or the like. The chassis 110 has a built-in motor and guide mechanism that raises and lowers a package. The upper surface of the raising/lowering platform 140 is a mounting surface 142 on which a wagon is placed. The raising/lowering platform 140 has a lifting mechanism that lifts the wagon. The space above the raising/lowering platform 140 is a loading space for loading a package. A rechargeable secondary battery is mounted on the chassis 110.

The mounting surface 142 is, for example, a plane parallel to the XY plane. The height of the mounting surface 142 changes depending on the operation of the raising/lowering platform 140. Further, the mounting surface 142 is provided with a positioning portion 141 used to determine the mounting position of the wagon.

Here, two positioning portions 141 are formed on the mounting surface 142. The positioning portion 141 has a concave portion formed in the mounting surface 142. In other words, the positioning portion 141 is a portion concaved below the mounting surface 142. As will be described below, the wagon is provided with a positioning pin that protrudes downward (−Z side). By inserting the positioning pin into the concave portion of the positioning portion 141, the mounting position of the wagon can be determined. The detailed configuration of the positioning portion 141 will be described below.

Two positioning portions 141 are arranged diagonally on the mounting surface 142 when viewed from the XY plane. In the X direction, the two positioning portions 141 are arranged in an offset manner from each other. In the Y direction, the two positioning portions 141 are arranged in an offset manner from each other. In the XY plane, the positioning portions 141 are respectively formed near the front right end and near the rear left end of the mounting surface 142. That is, in the mounting surface 142, one positioning portion 141 is provided on the +X side and the −Y side, and the other positioning portion 141 is provided on the −X side and the +Y side. This can prevent positional misalignment, so that the wagon 500 can be stably mounted. Specifically, positional misalignment in the rotational direction around the Z-axis can be prevented.

The stand 120 is attached to the chassis 110. The stand 120 is a rod-shaped member extending upward from the chassis 110. Here, the stand 120 is formed as a cylindrical shape of which the longitudinal direction is the Z direction. The longitudinal direction of the stand 120 is provided parallel to the Z direction. The stand 120 is arranged outside the raising/lowering platform 140. In other words, the stand 120 is arranged so as not to interfere with the raising and lowering movement of the raising/lowering platform 140. The stand 120 is arranged at one end of the chassis 110 in the Y direction (right-left direction). The stand 120 is attached near the front right corner of the chassis 110. The stand 120 is provided at the end of the chassis 110 on the +X side and the −Y side in the XY plane.

The stand 120 supports the operation unit 130. The operation unit 130 is attached near the upper end of the stand 120. Thereby, the operation unit 130 can be installed at a height that facilitating operation for a user. In other words, the stand 120 extends to a height that allows convenient operation for a standing user. The operation unit 130 extends from the stand 120 to the +Y side. The operation unit 130 is arranged at the center of the chassis 110 in the right-left direction.

The operation unit 130 includes a touch panel monitor and the like that accept a user's operations. Of course, the operation unit 130 may also include a microphone for audio input. The monitor of the operation unit 130 faces away from the chassis 110. In other words, a display surface (operation surface) of the operation unit 130 is on the +X side. The operation unit 130 may be provided to be attachable/detachable from the stand 120. That is, a holder for holding the touch panel may be attached to the stand 120. By operating the operation unit 130, the user can input the destination of the package, transportation information regarding the package, and the like. Further, the operation unit 130 can display, to the user, information on the contents, destination, and the like of a package in transit, a package scheduled to be transported.

A user stores a package (also referred to as an item or a transported object) in a wagon mounted on the mobile robot 100 and requests transportation. The mobile robot 100 autonomously moves to a set destination and transports a package. In other words, the mobile robot 100 executes a package transportation task (hereinafter also simply referred to as a task). In the following description, the location where the package is loaded is referred to as the transport origin or loading location, and the location where the package is delivered is also referred to as the transport destination or destination.

For example, assume that the mobile robot 100 moves within a general hospital that has a plurality of medical departments. The mobile robot 100 transports supplies, consumables, medical instruments, and the like between the medical departments. For example, the mobile robot 100 may deliver a package from a nurses' station in one department to a nurses' station in another department. Alternatively, the mobile robot 100 delivers packages from a storehouse for supplies and medical instruments to a nurses' station in a medical department. Additionally, the mobile robot 100 delivers medicine dispensed at the pharmacy to a medical department and a patient where they are scheduled to be used.

Examples of the package include medicine, consumables such as bandages, specimens, test instruments, medical instruments, hospital food, and supplies such as stationery. Medical devices include blood pressure monitors, blood transfusion pumps, syringe pumps, foot pumps, nurse call devices, bed exit sensors, low-pressure continuous suction units, electrocardiogram monitors, pharmaceutical infusion controllers, enteral feeding pumps, ventilators, cuff pressure gauges, touch sensors, suction devices, nebulizers, pulse oximeters, blood pressure monitors, artificial resuscitators, aseptic devices, echo devices, and the like. Additionally, meals such as hospital food and food for text preparation may be transported. Further, the mobile robot 100 may transport used equipment, used tableware, and the like. When the transport destination is on a different floor, the mobile robot 100 may move using an elevator or the like.

Figure 2:
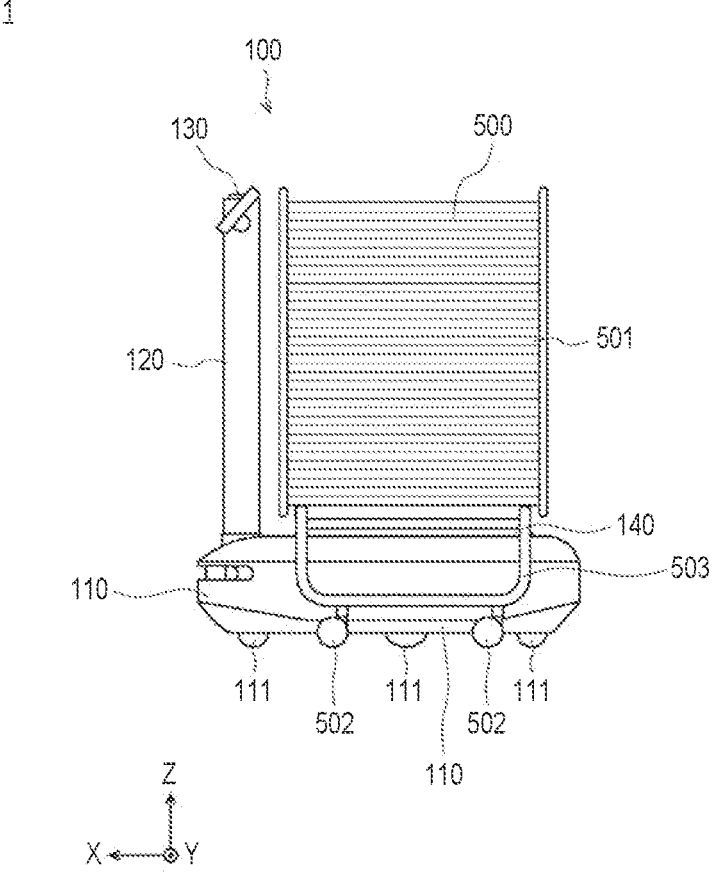
FIG. 2 is a side view illustrating a configuration in which the mobile robot is equipped with a wagon.

FIG. 2 is a side view illustrating the configuration of a transport system 1 including the mobile robot 100 and a wagon 500. As illustrated in FIG. 2, the mobile robot 100 can hold the wagon 500 using the raising/lowering platform 140. The wagon 500 accommodates objects to be transported. The wagon 500 is provided with wheels 502 and a frame 503. Wheels 502 are attached to the lower side of frame 503.

The frame 503 extends below the wagon 500. Thereby, a space is provided below the wagon 500 into which the chassis 110 enters. In other words, the chassis 110 can enter the space directly below the wagon 500. When the chassis 110 carries the wagon 500, the mobile robot 100 moves in the −X direction and enters directly under the wagon 500.

The delivery of the wagon 500 can be performed by raising/lowering the raising/lowering platform 140 by the raising and lowering mechanism. When the raising/lowering platform 140 is raised, the wagon 500 is lifted. That is, when the raising/lowering platform 140 rises, the wheels 502 leave the ground, and the wagon 500 is mounted on the chassis 110. When the raising/lowering platform 140 is lowered, the wheels 502 come into contact with the floor, and the top surface of the raising/lowering platform 140 separates from the wagon 500. The wagon 500 is placed on the floor. The wagon 500 can be unloaded from the chassis 110.

The chassis 110 is provided with one or a plurality of wheels 111. For example, in FIG. 1, two wheels 111 are provided on the left and right, and in FIG. 2, three wheels 111 are provided in the front and rear, but the number of wheels 111 is not particularly limited. For example, the mobile robot 100 may have four wheels or six wheels. Further, the mobile robot 100 may have eight or more wheels. The mobile robot 100 may include one or more drive wheels rotated by a motor. Further, one or more of the wheels 111 may be a driven wheel. By controlling the rotation of each wheel 111, the mobile robot 100 moves along a desired route.

Figure 3:
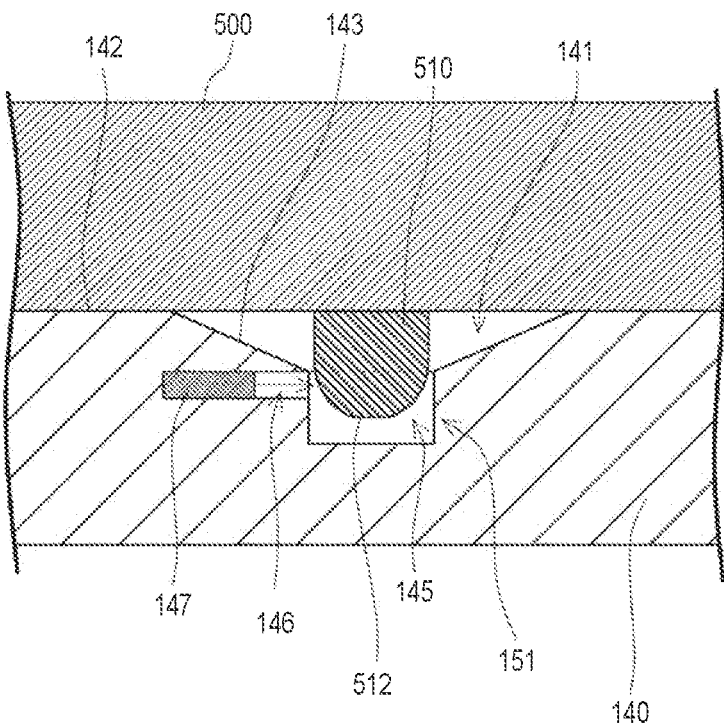
FIG. 3 is an enlarged cross-sectional view illustrating a detailed configuration of a positioning unit.
Figure 3:
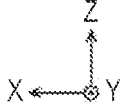

The configuration of the positioning portion 141 will be described using FIG. 3. FIG. 3 is an XZ cross-sectional view schematically illustrating the configuration of the positioning portion 141 and its surroundings. The positioning portion 141 is provided with a concave portion 145 and a tapered surface 143. A positioning pin 510 protruding downward is provided on the bottom surface of the wagon 500. The positioning pin 510 has a cylindrical shape, and a tip portion 512 with a hemispherical curved surface.

The positioning pin 510 provided on the wagon 500 is inserted into the concave portion 145. The positioning pin 510 is a convex portion that protrudes downward. The concave portion 145 is a hole larger than the positioning pin 510. When the raising/lowering platform 140 is raised, the positioning pin 510 is inserted into the concave portion 145.

A plurality of concave portions 145 are provided corresponding to the plurality of positioning pins 510. The concave portions 145 are provided in the mounting surface 142 in an arranged positional relationship corresponding to the arranged positional relationship of the positioning pins 510. These positioning pins 510 and concave portions 145 have corresponding engagement structures. One positioning pin 510 is inserted into one concave portion 145 when the wagon is placed. One positioning pin 510 is inserted into one concave portion 145 with a corresponding arranged positional relationship.

For example, the concave portion 145 is a cylindrical hole and has a diameter larger than the diameter of the positioning pin 510. The tapered surface 143 is provided between the concave portion 145 and the mounting surface 142 of the raising/lowering platform 140. The tapered surface 143 becomes wider toward the top. For example, the tapered surface 143 is a cone-shaped inclined surface. The tapered surface 143 has a shape corresponding to the side surface of a cone. When viewed from above, the outer shape of the tapered surface 143 is circular. The concave portion 145 is placed at the center of the circle of the tapered surface 143. The upper end of the tapered surface 143 is connected to the mounting surface 142, and the lower end is connected to the concave portion 145. The diameter of the tapered surface 143 increases from the concave portion 145 toward the mounting surface 142. The tapered surface 143 is preferably a smooth surface with low friction.

Further, a sensor 147 is arranged on the side surface of the concave portion 145. Specifically, an installation hole 146 is provided on the side of the concave portion 145. Here, the installation hole 146 is a space extending in the X direction. The sensor 147 is arranged in the installation hole 146. The sensor 147 is arranged facing laterally.

The sensor 147 is an optical sensor such as a fiber sensor. For example, the sensor 147 includes a light projector and a light receiver. The light beam projector projects a light toward the concave portion 145. In FIG. 3, since the sensor 147 is provided on the +X side of the concave portion 145, the sensor 147 emits a light in the −X direction. The light receiver receives a light from the concave portion 145.

Here, when the positioning pin 510 is placed in the concave portion 145, the light emitted from the sensor 147 will be incident on the positioning pin 510. Part of the light reflected by the positioning pin 510 is then reflected in the direction of the sensor 147. The sensor 147 detects the reflected light reflected by the positioning pin 510. Therefore, the mobile robot 100 can detect that the positioning pin 510 is inserted into the concave portion 145. That is, when the positioning pin 510 is not inserted into the concave portion 145, the amount of detected light becomes extremely low. In this case, the mobile robot 100 determines that a loading error has occurred.

Figure 4:
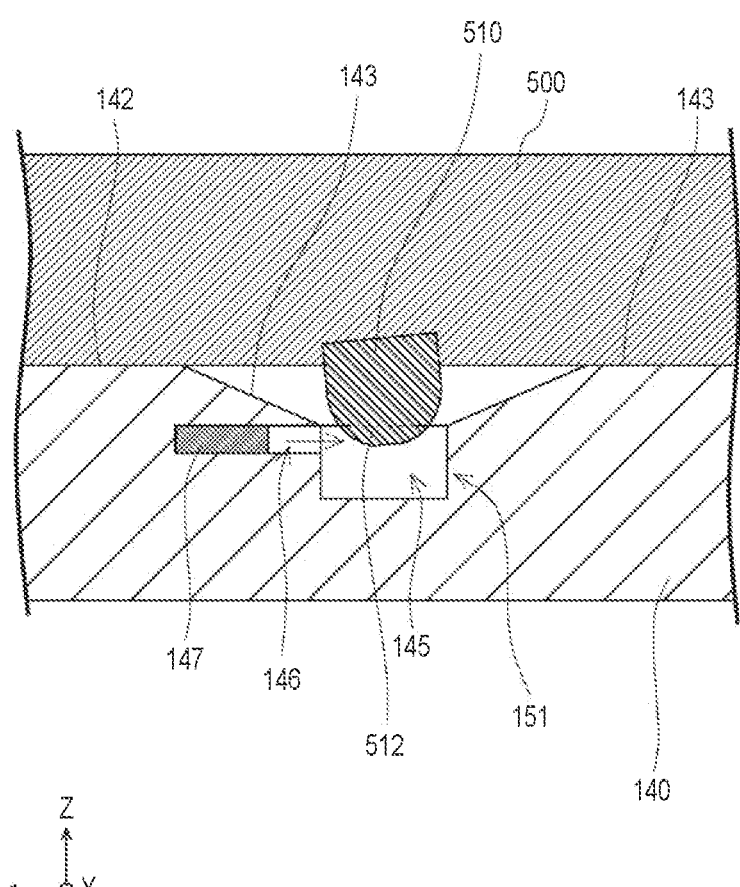
FIG. 4 is an enlarged cross-sectional view illustrating a detailed configuration of the positioning unit when a mounting abnormality occurs.
Figure 5:
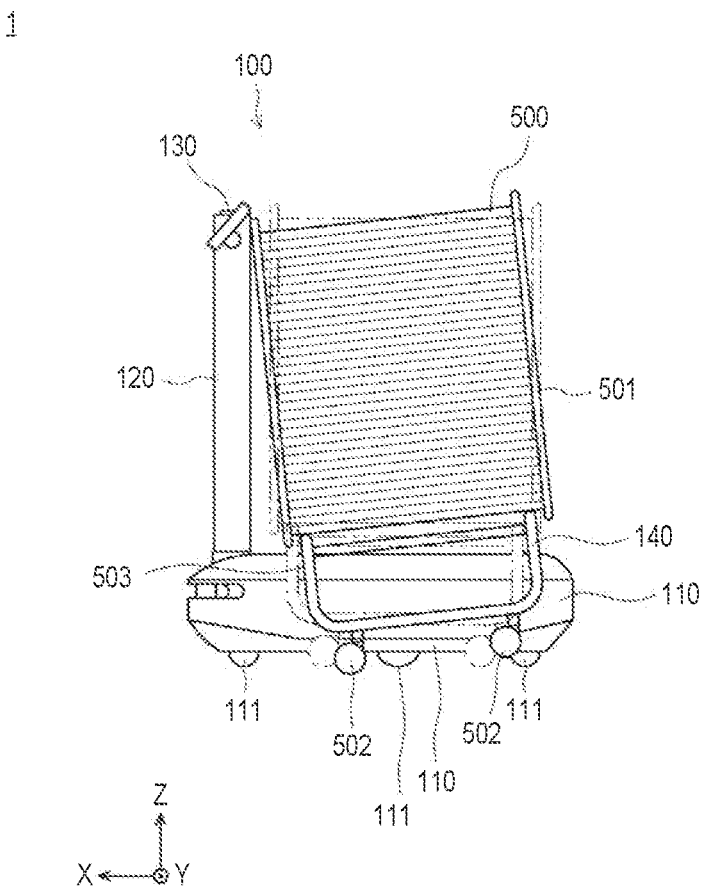
FIG. 5 is a side view illustrating a mounting abnormality.

Further, the insertion state of the positioning pin 510 can be determined according to the amount of reflected light detected by the sensor 147. FIG. 3 illustrates the configuration in a normal mounting state (see FIG. 2). FIG. 4 illustrates the configuration in an abnormal mounting state. Specifically, in FIG. 3, since the positioning pin 510 is parallel to the Z direction, the positioning pin 510 is inserted straight into the concave portion 145. On the other hand, in FIG. 4, the positioning pin 510 is inclined in the Z direction, as the mobile robot 100 mounts the wagon 500 in an inclined state, as illustrated in FIG. 5. Therefore, the positioning pin 510 is inserted into the concave portion 145 in an inclined state.

As illustrated in FIG. 3, the sensor 147 is arranged at the height of the tip portion 512 having a curved surface. Therefore, the sensor 147 detects the reflected light reflected by the tip portion 512. Depending on the inclination of the positioning pin 510, the amount of reflected light detected by the sensor 147 changes. In FIG. 4, the positioning pin 510 reflects light in the −Z direction. Therefore, the amount of light detected by the sensor 147 changes between the state illustrated in FIG. 3 and the state illustrated in FIG. 4. Therefore, it is possible to determine the insertion state according to the amount of light detected by the sensor 147. For example, by comparing the amount of detected light with a threshold value, it can be determined whether the insertion state is normal.

In the state illustrated in FIG. 4, there is a possibility that the wagon 500 is slantingly mounted. In such a case, since the wagon is not properly mounted, the mobile robot 100 determines that the mounting is abnormal. On the other hand, in FIG. 3, the mobile robot 100 determines that the wagon is normally mounted. The mobile robot 100 can detect whether a wagon is normally mounted.

The mobile robot 100 may not be able to move accurately to the underside of the wagon 500. For example, in the mobile robot 100 of an autonomous mobile type, the positional accuracy of movement may not be sufficiently high. When the movement position of the mobile robot 100 with respect to the wagon 500 deviates from the normal mounting position, there is a possibility that the mobile robot 100 cannot mount the wagon 500 normally. For example, as illustrated in FIG. 5, the wagon 500 may be tilted.

Since the sensor 147 is installed in the positioning portion 141, it is possible to determine whether the mounting state is normal or not. The relative positional accuracy between the mobile robot 100 and the wagon 500 is improved only by the raising and lowering movement of the raising/lowering platform 140. Further, in the case of a mounting abnormality, the operation unit 130 may sound an alert or the like.

The sensor 147 is placed on the side surface of the concave portion 145. That is, the sensor 147 is arranged horizontally. Thereby, the sensor 147 can be installed with the light projector and the light receiver of the sensor 147 facing sideways. Therefore, since the effect of dust and the like can be prevented, detection accuracy can be improved. For example, dust or dirt may accumulate on the bottom surface of the concave portion 145. When dust or dirt accumulates on the light receiver or the light emitter, the amount of detected light will change. By installing the sensor 147 on the side surface of the concave portion 145, the effect of dust or the like can be reduced. Therefore, changes in the amount of light can be suppressed, and false detection can be prevented.

The sensor 147 may be provided only in some concave portions 145 of the plurality of positioning portions 141. That is, the sensor 147 may be provided only in one concave portion 145 of the two positioning portions 141 illustrated in FIG. 1. Since the number of sensors 147 can be reduced, the device configuration can be simplified.

Further, the tip portion 512 of the positioning pin 510 has a curved surface, and becomes smaller toward the tip. Specifically, the tip portion 512 is hemispherical, and the diameter of the positioning pin 510 becomes smaller toward the tip. The diameter of the positioning pin 510 is perpendicular to the direction in which the positioning pin 510 protrudes. Thereby, detection accuracy can be improved. For example, depending on the height (insertion depth), insertion angle, and insertion position of the positioning pin 510, the inclination angle of the tip portion 512 at the light projection position from the sensor 147 changes. Therefore, when the position or angle of the positioning pin changes, the amount of light detected by the sensor 147 changes significantly. In other words, when the mounting position or mounting angle of the wagon 500 changes, the amount of light detected by the sensor 147 changes significantly. Thereby, the mobile robot 100 can accurately determine whether the mounting state is normal or abnormal.

Further, the surface of the positioning pin 510 may be colored in a color suitable for detection. For example, it is preferable that the positioning pin 510 may be formed in a color that absorbs light. Thereby, detection accuracy can be improved. Specifically, the positioning pin 510 may be formed in a color such as blue or gray. In other words, the reflectance and absorption of the positioning pin 510 can be changed to make it easier to detect the insertion state. Of course, the entire color of the positioning pin 510 may be the same, or the color may be partially changed. For example, only the tip portion 512 may have a changed color. Alternatively, the color may be changed in a gradation according to the position of the positioning pin 510 in the Z direction.

At least a portion corresponding to the light projection position of the sensor 147 may have a desired color. Further, the specular glossiness and shading of the tip portion 512 may be changed. Furthermore, a micro dimple structure may be formed on the surface of the tip portion 512 to facilitate detection. For example, the positioning pin 510 may be colored in a desired color, or may be made of a resin material of a desired color. Further, the effect of scattered light can be reduced by making the concave portion 145, tapered surface 143, and installation hole 146 black or the like. Thereby, detection accuracy can be improved.

Further, the tapered surface 143 is formed around the concave portion 145. The tapered surface 143 is located between the concave portion 145 and the mounting surface 142. The tapered surface 143 widens upward. By doing so, the positioning pin 510 can be reliably inserted into the concave portion 145. For example, the surface of the tapered surface 143 is made to have a small coefficient of friction.

Depending on the positional accuracy of the movement of the mobile robot 100, the positions of the mobile robot 100 and the wagon 500 may deviate from their normal mounting positions. When the raising/lowering platform 140 rises while deviating from its normal mounting position, the positioning pin 510 comes into contact with the tapered surface 143. By reducing the friction of the tapered surface 143, the positioning pin 510 slides on the tapered surface 143 and is inserted into the concave portion 145. By doing this, the mobile robot 100 can reliably mount the wagon 500.

The number of positioning portions 141 provided in the raising/lowering platform 140 is not limited to two. The raising/lowering platform 140 may be provided with one or more positioning portions 141. Therefore, the raising/lowering platform 140 may be provided with three or more positioning portions 141. When two or more positioning portions 141 are provided in the raising/lowering platform 140, the sensor 147 may be provided in at least one positioning portion 141.

Figure 6:
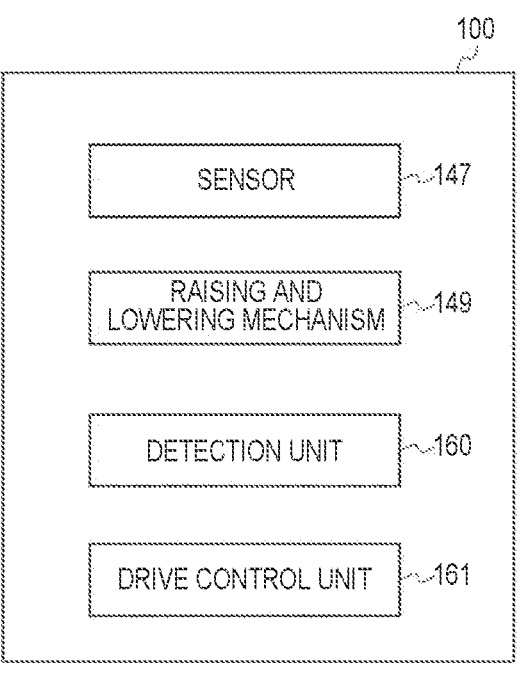
FIG. 6 is a block diagram illustrating a control system of the mobile robot.

FIG. 6 is a block diagram illustrating the control system of the mobile robot 100. The mobile robot 100 includes the sensor 147, the raising and lowering mechanism 149, a detection unit 160, and a drive control unit 161. Communication between the sensor 147, raising and lowering mechanism 149, detection unit 160, and drive control unit 161 and control executed thereby may be executed by a control computer installed in the mobile robot 100. The drive control unit 161 controls the wheels 111 to move the mobile robot 100. For example, the drive control unit 161 outputs a command value for the drive motor of the wheels 111 so that the mobile robot 100 moves along the route.

The raising and lowering mechanism 149 raises and lowers the raising/lowering platform 140. This changes the height of the mounting surface 142. The sensor 147 detects the reflected light from the positioning pin 510, as described above. The detection unit 160 detects that the positioning pin 510 is inserted into the concave portion 145 according to the amount of light detected by the sensor 147. Specifically, the detection unit 160 determines whether the insertion state of the positioning pin 510 is normal or not according to the amount of detected light. When the detection unit 160 detects that the insertion state is normal, it determines that the wagon is normally mounted. The detection unit 160 compares the amount of detected light with a threshold value and makes a determination based on the comparison result.

For example, when the amount of detected light is lower than the threshold value, the detection unit 160 determines that there is a mounting abnormality. Alternatively, the detection unit 160 may set an upper limit and a lower limit for the threshold value. When the amount of detected light is equal to or greater than the upper limit threshold value or equal to or less than the lower limit threshold value, the detection unit 160 determines that there is a mounting abnormality. In other words, when it is between the upper limit threshold value and the lower limit threshold value, the detection unit 160 determines that the mounting is normal.

The detection unit 160 determines that there is a loading error when the positioning pin 510 is not properly inserted into the concave portion 145. When a loading error is determined, the raising and lowering mechanism 149 operates to retry loading. As the raising and lowering mechanism 149 lowers the raising/lowering platform 140, the mounting surface 142 is lowered. As a result, the positioning pin 510 is removed from the concave portion 145. Then, when the raising and lowering mechanism 149 raises the raising/lowering platform 140 again, the positioning pin 510 is inserted into the concave portion 145.

Before raising the raising/lowering platform 140 again, the drive control unit 161 may drive the wheels 111 to perform positioning. That is, the drive control unit 161 may drive the wheels 111 to move the mobile robot 100. For example, after the mobile robot 100 moves away from the wagon 500, it enters under the wagon 500. Further, the drive control unit 161 may decide the adjustment amount and adjustment direction for alignment according to the detection result of the sensor 147. Thereby, the position of the mobile robot 100 can be finely adjusted.

Figure 7:
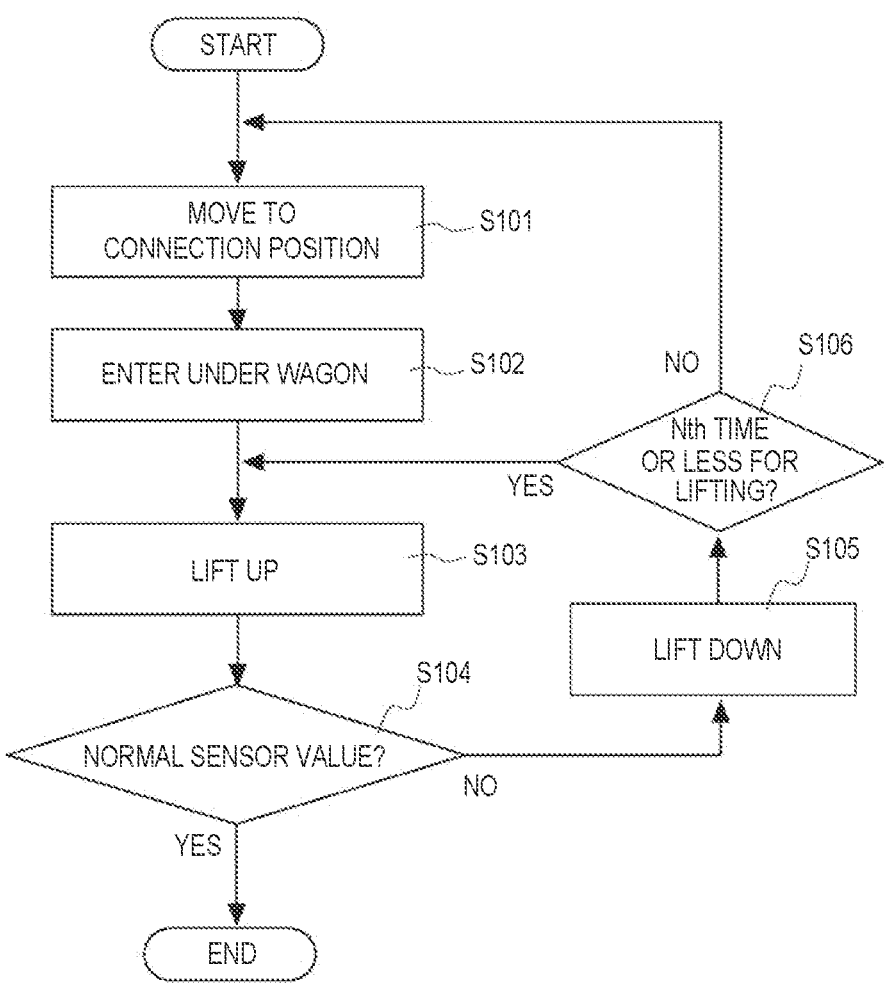
FIG. 7 is a flowchart illustrating a mounting operation of the wagon.

FIG. 7 is a flowchart illustrating the operation of the mobile robot 100 mounting the wagon 500. First, the mobile robot 100 moves to a connection position for the wagon (S101). The connection position is a position in front of the wagon 500. Further, at the start of the processing, the number of lifts is 0. The mobile robot 100 enters under the wagon 500 (S102). The raising/lowering platform 140 lifts up the wagon 500 (S103). That is, the raising and lowering mechanism 149 raises the raising/lowering platform 140. In step S103, the number of lifts is incremented.

Next, the detection unit 160 determines whether the sensor value is normal (S104). That is, the detection unit 160 compares the amount of light detected by the sensor with a threshold value. The detection unit 160 determines whether the sensor value is within a normal range defined by a threshold value. When the sensor value is normal (YES in S104), the mounting operation ends. In other words, since the mobile robot 100 has normally loaded the wagon 500, the mobile robot 100 starts moving to the destination.

When the sensor value is not normal (NO in S104), the raising/lowering platform 140 lifts the wagon 500 (S105) down. That is, the raising and lowering mechanism 149 lowers the raising/lowering platform 140. Next, the detection unit 160 determines whether the lift is the Nth time or less (S106). N is an integer of 1 or more. When the lift is the Nth time or less (YES in S106), the raising/lowering platform 140 lifts up the wagon 500 again (S103).

When the lift is not the Nth time or less (NO in S106), the mobile robot 100 moves to the connection position (S101). In other words, the mobile robot 100 comes out from directly below the wagon 500 and moves to the front of the wagon 500. Then, the processing from step S102 is repeated. By doing this, the wagon 500 can be loaded normally.

The mobile robot 100 may use a machine learning model such as deep learning in route searching and control of the drive control unit 161.

Further, part or all of the processing in the mobile robot 100 and the like described above can be realized as a computer program. Such programs can be stored and provided to a computer using various types of non-transitory computer-readable media. Non-transitory computer-readable media includes various types of tangible storage media. Examples of non-transitory computer-readable media include magnetic recording media (for example, floppy disks, magnetic tape, hard disk drives), magneto-optical recording media (for example, magneto-optical disks), CD-read only memory (ROM), CD-R, CD-R/W, semiconductor memory (for example, mask ROM, programmable ROM (PROM), erasable PROM (EPROM), Flash ROM, random access memory (RAM)). The program may also be provided to the computer on various types of transitory computer-readable media. Examples of transitory computer-readable media include electrical signals, optical signals, and electromagnetic waves. The transitory computer-readable medium can provide the program to the computer via wired communication channels, such as electrical wires and fiber optics, or wireless communication channels.

The present disclosure is not limited to the above-described embodiment, and can be modified as appropriate without departing from the scope of the present disclosure. For example, although the above-described embodiment describes a system in which a mobile robot moves autonomously within a hospital, the above-described system can transport, as packages, predetermined items in a hotel, restaurant, office building, event venue, or complex facility.

What is claimed is:

1. A transport system that transports a wagon that has a plurality of convex portions that protrude downward, the transport system comprising a mobile robot configured to move with the wagon mounted on the mobile robot, wherein the mobile robot comprises a platform that has a mounting surface on which the wagon is placed and that is configured to enter beneath the wagon, a raising and lowering mechanism configured to raise and lower the platform to change the height of the mounting surface to deliver the wagon, a plurality of concave portions in, and recessed below, the mounting surface corresponding to the plurality of convex portions of the wagon, an optical sensor on a side surface of at least one of the plurality of concave portions, and a controller configured to detect that at least one of the plurality of convex portions is inserted into the at least one concave portion according to a detection result of the optical sensor, the mobile robot is configured to mount the wagon by raising the platform to lift the wagon, the optical sensor includes a light projector configured to emit light toward the at least one concave portion and a light receiver configured to detect light reflected from the at least one of the plurality of convex portions, the light projector and the light receiver face laterally, the convex portion includes a cylindrical shaped portion and a hemispherical shaped portion, and the optical sensor is at a height aligned with the hemispherical shaped portion.

2. The transport system according to claim 1, wherein the controller is configured to compare an amount of light detected by the optical sensor with a threshold value to determine whether a state of insertion of the convex portion into the concave portion is normal.

3. The transport system according to claim 1, wherein the optical sensor is only in some of the plurality of concave portions.

4. The transport system according to claim 1, wherein the hemispherical shaped portion is a tip of the convex portion such that a diameter of the convex portion becomes smaller toward the tip.

5. The transport system according to claim 1, further comprising a tapered surface that widens upward between the mounting surface and each of the plurality of concave portions.

6. The transport system according to claim 1, wherein one concave portion is arranged diagonally on the mounting surface with respect to the other concave portion.

7. The transport system according to claim 1, wherein when the convex portion does not enter the concave portion, the transport system is configured to determine that there is a loading error and the transport system is configured to retry loading.

8. The transport system according to claim 1, wherein a surface of the convex portion has a color that absorbs light.

9. The transport system according to claim 1 further comprising the wagon.

10. The transport system according to claim 1, wherein the mobile robot is configured to move within a hospital that has a plurality of medical departments.

11. The transport system according to claim 1, wherein the convex portion is colored blue.

12. The transport system according to claim 1, wherein the convex portion is colored gray.

13. The transport system according to claim 1, wherein the hemispherical portion has a surface with a micro dimple structure.

14. The transport system according to claim 1, wherein the optical sensor is at a height corresponding to a junction between the cylindrical portion and the hemispherical portion.

* * * * *